May 27, 1952
E. A. BAYER ET AL
2,598,489
HAND TRUCK AND LIFT
Filed April 21, 1950
2 SHEETS—SHEET 1
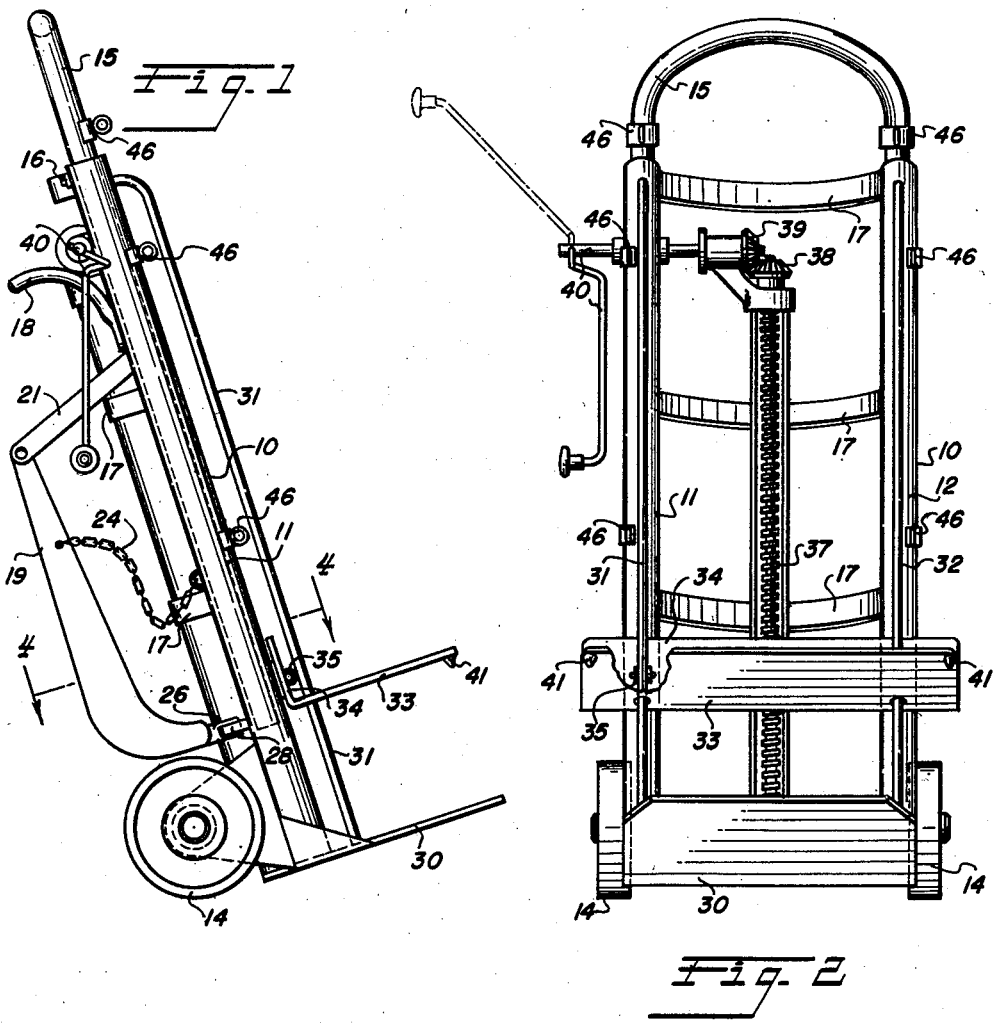
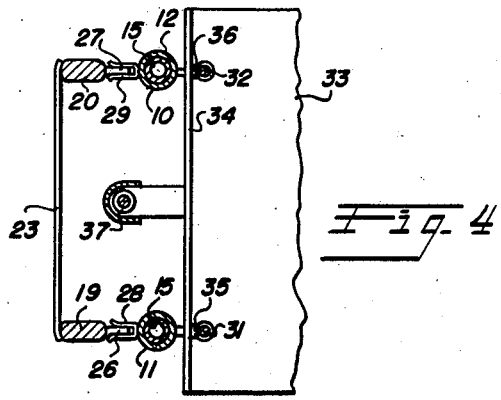
INVENTORS
Elton A. Bayer
Louis D. Langdon
BY *Irving K. McCathran*
THEIR ATTORNEY

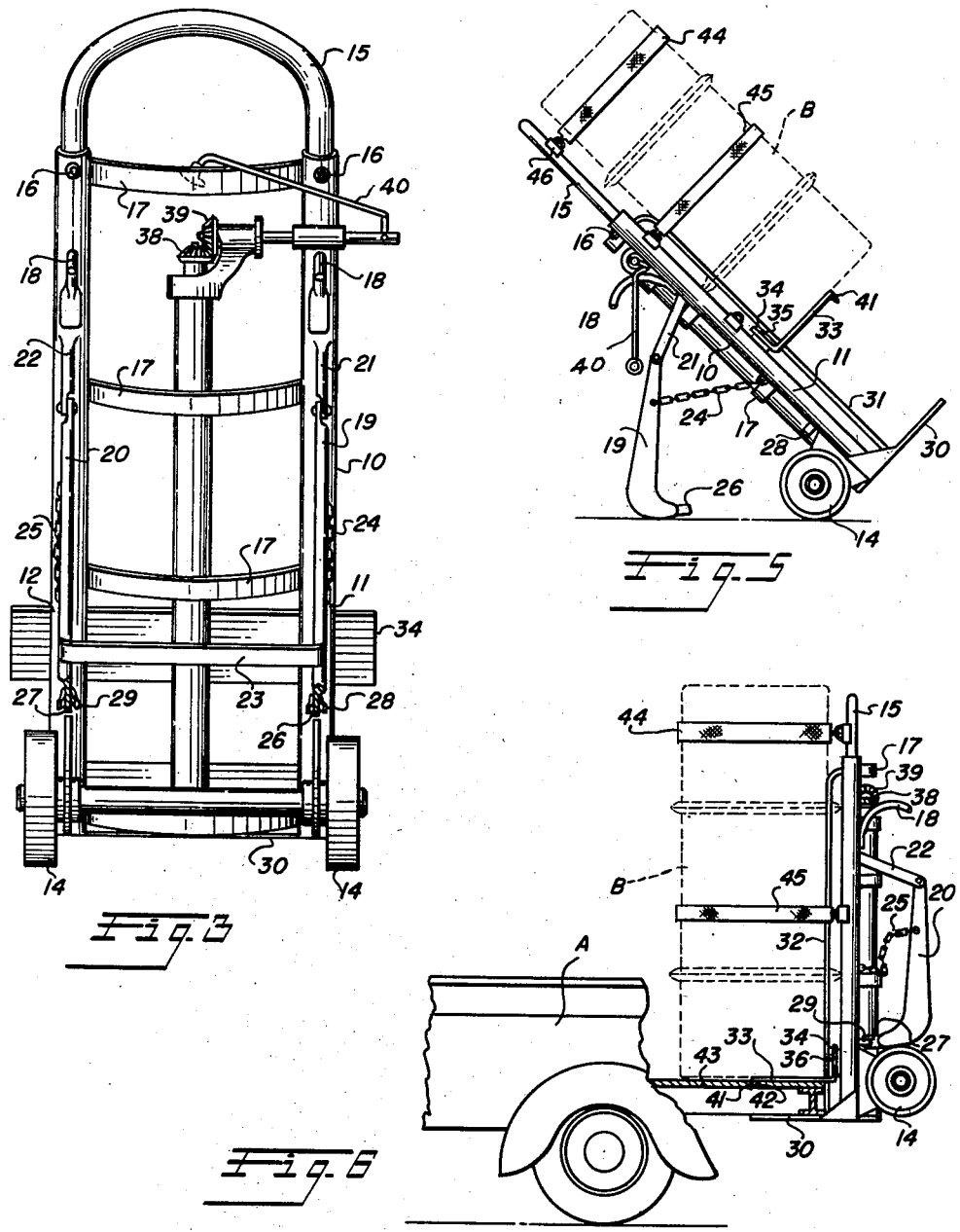

Patented May 27, 1952

2,598,489

UNITED STATES PATENT OFFICE 2,598,489

HAND TRUCK AND LIFT

Elton A. Bayer, Sioux Falls, and Louis D. Langdon, Centerville, S. Dak.

Application April 21, 1950, Serial No. 157,386

4 Claims. (Cl. 214—100)

This invention relates to a hand truck and a means for lifting articles carried by the truck.

One important object of this invention is the production of a simple and efficient means for elevating and lowering the load receiving platform which is carried by the truck.

A further object of this invention is the production of a hand truck which is so constructed as to facilitate the loading and unloading of refrigerators, stoves, heavy bottle gas, kegs, linoleum, and any other heavy items by an operator without the necessity of employing other assistance.

Other objects and advantages of this invention will appear throughout the following specification and claims.

In the drawings:

Figure 1 is a side elevational view of the hand truck;

Figure 2 is a front elevational view thereof;

Figure 3 is a rear elevational view of the truck;

Figure 4 is a transverse sectional view taken on line 4—4 of Figure 1;

Figure 5 is a side elevational view of the hand truck showing the bracing means in an operative position, a supported article being shown in dotted lines;

Figure 6 is a side elevational view of the hand truck mounted upon the rear end of a conveying vehicle, the article supported by the hand truck being shown in dotted lines.

By referring to the drawings in detail, it will be seen that 10 designates the frame of the hand truck which comprises a pair of parallel hollow side bars 11 and 12. These side bars 11 and 12 are connected at their lower ends by a suitable transverse axle 13, which axle is in turn supported upon the conventional hand truck wheels 14. An inverted U-shaped handle 15 is slidably mounted in the upper ends of the side bars 11 and 12 to facilitate adjustment as to length, and this handle 15 is preferably locked in an adjusted position by suitable conventional binding screws 16. The side bars 11 and 12 preferably are braced in transverse relation by means of the bracing strips 17, which strips 17 are located at spaced intervals throughout the length of the body 10. Hand grips 18 also are carried by the rear faces of the side bars 11 and 12.

A pair of leg braces 19 and 20 are hingedly connected rearwardly of the side bars 11 and 12 by means of suitable brackets 21 and 22 respectively. These braces 19 and 20 are braced transversely at their lower ends by means of a transverse tie strip 23. These braces 19 and 20 may be made of any size and design to suit the type of work involved and to adequately support the frame 10 when the hand truck is at rest an incline, as shown in Figure 5. Chains 24 and 25 are respectively connected to legs 19 and 20 and are anchored at their opposite ends to the respective side bars 11 and 12 to limit the outward swing of the legs from an inoperative to an operative position. The legs 19 and 20 are provided with inturned ends 26 and 27 respectively, which act as supporting feet when the legs are in a bracing position. Spring clips or sockets 28 and 29 are carried near the lower ends of the bars 11 and 12 to receive the respective inturned ends 26 and 27 and to releasably hold the braces 19 and 20 in an inoperative position when the braces are not in use. These braces also constitute runners when the ends are secured in the clips 28 and 29, and these braces perform the function of the conventional fixed runners ordinarily employed upon trucks of this character.

The frame 10 is provided with the conventional lift plate 30 at the bottom thereof. The side bars 11 and 12 carry track rails 31 and 32 respectively in spaced relation to the front faces of these bars. A sliding lift plate 33 is slidably mounted upon the rails 31 and 32 and is provided with an upwardly extending inner flange 34. This flange fits between the side bars and the rails, as shown in Figure 1. Rollers 35 and 36 are carried by the flange 34 and have rolling or bearing contact with the inner faces of the rails 31 and 32, as shown also in Figures 1 and 4, to stabilize the traveling or lift plate 33. A conventional lift mechanism 37 is provided for the lift plate 33 in the nature of a worm screw actuated by gears 38 and 39, the gear 39 being actuated by a conventional crank 40. An hydraulic lift may be provided, if desired, within the scope of the invention.

The sliding lift plate is provided with depending lugs 41 upon the bottom face thereof, which are adapted to fit into sockets 42 in the floor 43 of the vehicle A, in the manner shown in Figure 6, when transporting the hand truck and article carried thereby. The sliding lift plate, as shown in Figure 6, is adapted to rest upon the upper face of the floor 43 and the conventional stationary lift plate is adapted to fit under the body of the vehicle. The plates 30 and 33 grip the vehicle in clamping relation to hold the hand truck in a vertical position to support the article B carried thereby in the rear of the vehicle A.

The hand truck when loading the article B, after the article has been placed upon the hand truck is moved to the rear of the vehicle A. The sliding plate 33 is raised to the level of the floor 43 of the vehicle A where the plate 33 overlies the floor 43 and the lugs 41 fit into the sockets 42. The crank 40 is actuated to lift the hand truck upwardly so that the plate 30 tightly clamps against the bottom of the vehicle. The hand truck will then be firmly held in position upon the rear end of the vehicle A. Suitable anchoring straps 44 and 45 are adapted to be selectively secured to the anchoring clips 46 which are carried by the side bars 10 and 11. These straps are adapted to pass around the article B to hold the article B upon the hand track.

It should be understood that certain detail changes in the mechanical construction and arrangement of parts may be employed without departing from the spirit of the invention, so long as such changes fall within the scope of the appended claims.

Having described the invention, what is claimed as new is:

1. A hand truck and lift comprising a frame, said frame comprising a pair of spaced parallel bars, wheels supporting said frame at one end thereof; a fixed lift plate carried at one end of the frame, a second movable lift plate slidable longitudinally of the frame toward and away from the fixed lift plate, means for selectively moving the movable lift plate relative to the fixed plate, track rails carried by said frame in spaced parallel relation to said parallel bars, said movable lift plate having guiding means receiving said track rails for guarding the sliding movement of said movable lift plate, and said movable lift plate comprising a flange extending between said rails and bars and rearwardly of said track rails, and rollers carried by said flange and engaging said track rails to resist forward tilting of the movable lift plate.

2. A hand truck and lift comprising a frame, wheels supporting said frame at one end thereof; a fixed lift plate carried at one end of the frame, a second movable lift plate slidable longitudinally of the frame toward and away from the fixed lift plate, means for selectively moving the movable lift plate relative to the fixed plate, and tapering lugs carried by the movable plate in spaced lateral relation for biting engagement with the floor of a vehicle to anchor the movable plate in position, the movable plate and fixed plate being adapted to grip the bottom of a vehicle therebetween to fixedly secure the hand truck in a vertical position upon the rear end of a vehicle.

3. A hand truck of the class described comprising a frame, supporting wheels carried at one end of the frame, hinged runners pivoted at one end to the rear of the frame, said runners having enlarged inwardly curved outer free ends, spring clips detachably fixing the outer free ends of said runners to the frame, said runners being adapted to be swung outwardly of the frame to provide braces to support the frame at rest in an angular position, and means for limiting the outward swinging movement of said braces.

4. A hand truck of the class described comprising a frame, supporting wheels carried at one end of the frame, angle brackets carried by the rear of said frame adjacent the opposite end of said frame, leg braces constituting runners pivotally connected at inner ends to said brackets, said braces having inturned outer free ends, spring clips carried by said frame detachably fixing the free ends of said runners to the frame, said runners being adapted to be swung outwardly of the frame to provide braces to support the frame at rest in an angular position, said braces extending in a plane with the treads of said wheels when said braces are engaged by said clips to provide runners throughout a major portion of the length of said frame, and means for limiting the outward swinging movement of said braces.

ELTON A. BAYER.
LOUIS D. LANGDON.

REFERENCES CITED

The following references are of record in the file of this patent:

UNITED STATES PATENTS

| Number | Name | Date |
| --- | --- | --- |
| 771,804 | Blomquist | Oct. 11, 1904 |
| 795,147 | Magoffin | July 18, 1905 |
| 1,927,710 | Lindsay | Sept. 19, 1933 |
| 2,229,244 | Husted | Jan. 21, 1941 |
| 2,430,107 | Cronrath | Nov. 4, 1947 |
| 2,479,440 | Denny | Feb. 14, 1950 |
| 2,514,825 | Zenko | July 11, 1950 |

FOREIGN PATENTS

| Number | Country | Date |
| --- | --- | --- |
| 182,854 | Switzerland | May 16, 1936 |